US012017703B2

(12) United States Patent
Morimoto et al.

(10) Patent No.: US 12,017,703 B2
(45) Date of Patent: Jun. 25, 2024

(54) FRONT STRUCTURE OF VEHICLE

(71) Applicant: Mazda Motor Corporation, Hiroshima (JP)

(72) Inventors: Makoto Morimoto, Hiroshima (JP); Etsuji Saiki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 309 days.

(21) Appl. No.: 17/708,014

(22) Filed: Mar. 30, 2022

(65) Prior Publication Data
US 2022/0315125 A1     Oct. 6, 2022

(30) Foreign Application Priority Data

Apr. 5, 2021    (JP) .................................. 2021-064053

(51) Int. Cl.
*B62D 25/08*     (2006.01)
*B60H 1/28*      (2006.01)
*B60R 13/07*     (2006.01)

(52) U.S. Cl.
CPC ............ *B62D 25/081* (2013.01); *B60H 1/28* (2013.01); *B60R 13/07* (2013.01)

(58) Field of Classification Search
CPC .......... B60H 1/28; B62D 25/081; B60R 13/07
See application file for complete search history.

(56) References Cited

U.S. PATENT DOCUMENTS 10,196,093 B2 * 2/2019 Muraki .................. B60R 13/07

FOREIGN PATENT DOCUMENTS

JP         2020-50087 A     4/2020

OTHER PUBLICATIONS

JP-59023720-A, Feb. 7, 1984, Japan, Muto, Yoshihiko (Year: 1984).*

* cited by examiner

*Primary Examiner* — Jessica Yuen
(74) *Attorney, Agent, or Firm* — XSENSUS LLP

(57) ABSTRACT

The front structure of a vehicle includes a drain, provided below a cowl grille, that forms a closed cross-section in cooperation with the cowl grille, in which the drain has flow path portions that extend in the vehicle width direction and serve as paths through which water flows, the flow path portion has air speed reduction portions that reduce the flow speed of air flowing through the flow path portion in the region ranging from the position that overlaps with an outside air introduction hole of the cowl grille in the vehicle width direction to an air inlet of a dash panel.

10 Claims, 14 Drawing Sheets

FRONT STRUCTURE OF VEHICLE

CROSS-REFERENCE TO RELATED APPLICATION

The present application claims priority to Japanese Patent Application 2021-064053, filed Apr. 5, 2021, the entire contents of which are incorporated herein by reference.

BACKGROUND

Field

The present disclosure relates to a front structure of a vehicle, and more particularly, to a front structure of a vehicle that includes a dash panel extending in the vehicle width direction and performs partitioning into an engine compartment and a vehicle interior in the vehicle front-rear direction, an air inlet provided on one end side in the vehicle width direction of the dash panel, and a cowl grille that has an outside air introduction hole at a position away from the air inlet to the other end side in the vehicle width direction.

Description of the Related Art

Conventionally, a cowl grille is provided below a front windshield and the cowl grille has an outside air introduction hole through which outside air for air conditioning is taken in. There is a known structure in which the water entering the cowl grille together with outside air from the outside air introduction hole described above is drained to the outer side in the vehicle width direction via the drain member below the cowl grille, and only air is introduced into the air inlet that is opened and formed in the dash panel (see patent document 1).

However, when the area of the closed cross-section formed by the cowl grille described above and the drain member described above is small, the flow speed of the air that flows in the vehicle width direction in the closed cross-section described above by being sucked by the suction force of an air-conditioning blower increases, the water in the drain member is thrown up by the high speed air, water droplets enter the air inlet, thereby causing a problem with the air-conditioning system.

PRIOR ART DOCUMENTS

Patent Documents

[Patent document 1] JP-A-2020-50087

SUMMARY

Technical Problems

An object of the present disclosure is to provide the front structure of a vehicle that can prevent the water in the drain member being thrown up by high-speed air even if the area of the closed cross-section formed by the cowl grille and the drain member is small.

Means for Solving the Problems

A front structure of a vehicle according to the present disclosure includes a dash panel that extends in a vehicle width direction and performs partitioning into an engine compartment and a vehicle interior in a vehicle front-rear direction; an air inlet provided on one end side in the vehicle width direction of the dash panel; a cowl grille that has an outside air introduction hole at a position away from the air inlet toward the other end side in the vehicle width direction; a drain member provided below the cowl grille, the drain member forming a closed cross-section in cooperation with the cowl grille, in which the drain member has a flow path portion that extends in the vehicle width direction and serves as a path through which water flows, and the flow path portion has an air speed reduction portion that reduces a flow speed of air flowing through the flow path portion in a region ranging from a position that overlaps with the outside air introduction hole in the vehicle width direction to the air inlet.

In the structure described above, air flows in the closed cross-section in the vehicle width direction above the water flowing through the flow path portion of the drain member. Since the air speed reduction portion described above causes air resistance in the space above the flow path portion, the speed (air speed) of the air flowing in the closed cross-section is reduced by the air speed reduction portion. As a result, the droplets thrown up by the air can be prevented from being entrained to the air inlet of the dash panel.

That is, even if the area of the closed cross-section formed by the cowl grille and the drain member is small, it is possible to prevent the water in the drain member from being thrown up by high-speed air and prevent the droplets from being entrained to the air inlet of the dash panel.

According to an embodiment of the present disclosure, the air speed reduction portion includes a plurality of first ribs that extend in the vehicle front-rear direction in the flow path portion and partially overlap with each other in vehicle side view. In the structure described above, the plurality of first ribs serve as resistance to the air flowing in the closed cross-section in the vehicle width direction, thereby suppressing the entrainment of droplets to the air inlet.

According to an embodiment of the present disclosure, the first ribs extend from a front end or a rear end of the flow path portion toward a middle portion of the flow path portion within a flow path width in the vehicle front-rear direction of the flow path portion and is inclined to an outer side in the vehicle width direction toward the middle portion of the flow path portion. In the structure described above, a flow of water flowing at a high flow speed in the closed cross-section can be inhibited by the first ribs while a flow of water at a low flow speed is not inhibited, further suppressing the entrainment of droplets to the air inlet by reducing the speed of air.

According to an embodiment of the present disclosure, the plurality of first ribs include a front rib extending from the front end of the flow path portion to a middle portion of the flow path portion within a flow path width in the vehicle front-rear direction and a rear rib spaced apart in the vehicle width direction from the front rib, the rear rib extending from the rear end of the flow path portion to the middle portion of the flow path portion within the flow path width in the vehicle front-rear direction, and the front rib and the rear rib partially overlap with each other in vehicle side view.

In the structure described above, the space above the flow path portion in vehicle side view can be partitioned in the width direction by the first ribs to reduce the speed of the air to be introduced to the air inlet more effectively.

According to an embodiment of the present disclosure, the drain member extends in the vehicle width direction and has an inclined portion inclined downward toward the outer side in the vehicle width direction. In the structure described above, since the inclined portion described above of the drain member is inclined downward toward the outer side in the vehicle width direction and the drain route on the upper surface of the inclined portion is located downward toward the air inlet of the dash panel, the entrainment of droplets to the air inlet can be further suppressed.

According to an embodiment of the present disclosure, the drain member has a slope-shaped portion that extends upward toward a rear side from the rear end of the flow path portion, and the slope-shaped portion has a plurality of second ribs extending in the vehicle front-rear direction, the second ribs being spaced apart from each other in the vehicle width direction.

In the structure described above, while the water flowing through the slope-shaped portion flows downward to the flow path portion, the speed of the air flowing in the vehicle width direction in the closed cross-section above the water in the slope-shaped portion can be reduced by the second rib described above. As a result, the entrainment of droplets to the air outlet described above can be further suppressed.

According to an embodiment of the present disclosure, the second ribs of the slope-shaped portion has a slanting portion inclined to an inner side in the vehicle width direction toward a lower side. In the structure described above, the direction of the water flowing through the slope-shaped portion is once changed to the inner side in the vehicle width direction by the slanting portion to reduce the momentum of the water, thereby reducing the flow speed thereof. This can suppress the generation of droplets when the water flows from the slope-shaped portion downward and meets the flow path portion. In addition, the water flowing through the slope-shaped portion can flow downward and meet the flow path portion described above at the position away from the air inlet of the dash panel toward the inner side in the vehicle width direction.

Advantages

The present disclosure has the effect of preventing the water in the drain member from being thrown up by high-speed air even if the area of the closed cross-section formed by the cowl grille and the drain member is small.

DESCRIPTION OF EMBODIMENTS

An object of preventing water in a drain member from being thrown up by high-speed air even if the area of the closed cross-section formed by a cowl grille and a drain member is small is achieved by a structure that includes a dash panel that extends in a vehicle width direction and performs partitioning into an engine compartment and a vehicle interior in a vehicle front-rear direction; an air inlet provided on one end side in the vehicle width direction of the dash panel; a cowl grille that has an outside air introduction hole at a position away from the air inlet toward the other end side in the vehicle width direction; and a drain member provided below the cowl grille, the drain member forming a closed cross-section in cooperation with the cowl grille, in which the drain member has a flow path portion that extends in the vehicle width direction and serves as a path through which water flows, and the flow path portion has an air speed reduction portion that reduces a flow speed of air flowing through the flow path portion in a region ranging from a position that overlaps with the outside air introduction hole in the vehicle width direction to the air inlet.

EXAMPLE

Figure 1:
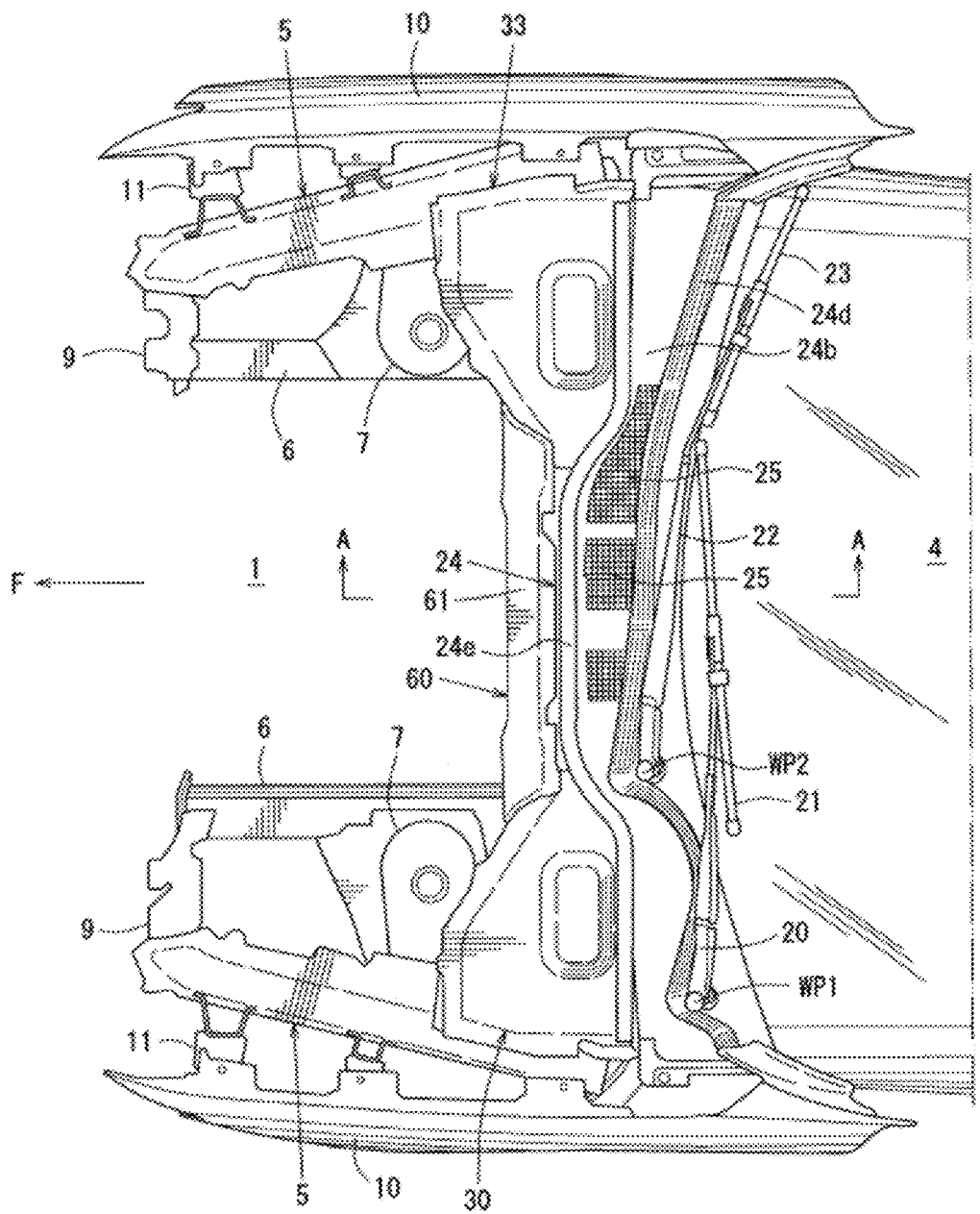
FIG. 1 is a plan view of a vehicle front portion having a front structure of a vehicle according to the present disclosure.

One example of the present disclosure will be described in detail below with reference to the drawings. The drawings illustrate the front structure of a vehicle, FIG. 1 is a plan view of the vehicle front portion having the front structure of the vehicle, FIG. 2 is a plan view of the vehicle front portion in which the cowl grille has been removed from FIG. 1, and FIG. 3 is a plan view of the vehicle front portion in which the cover member has been removed from FIG. 2.

Figure 2:
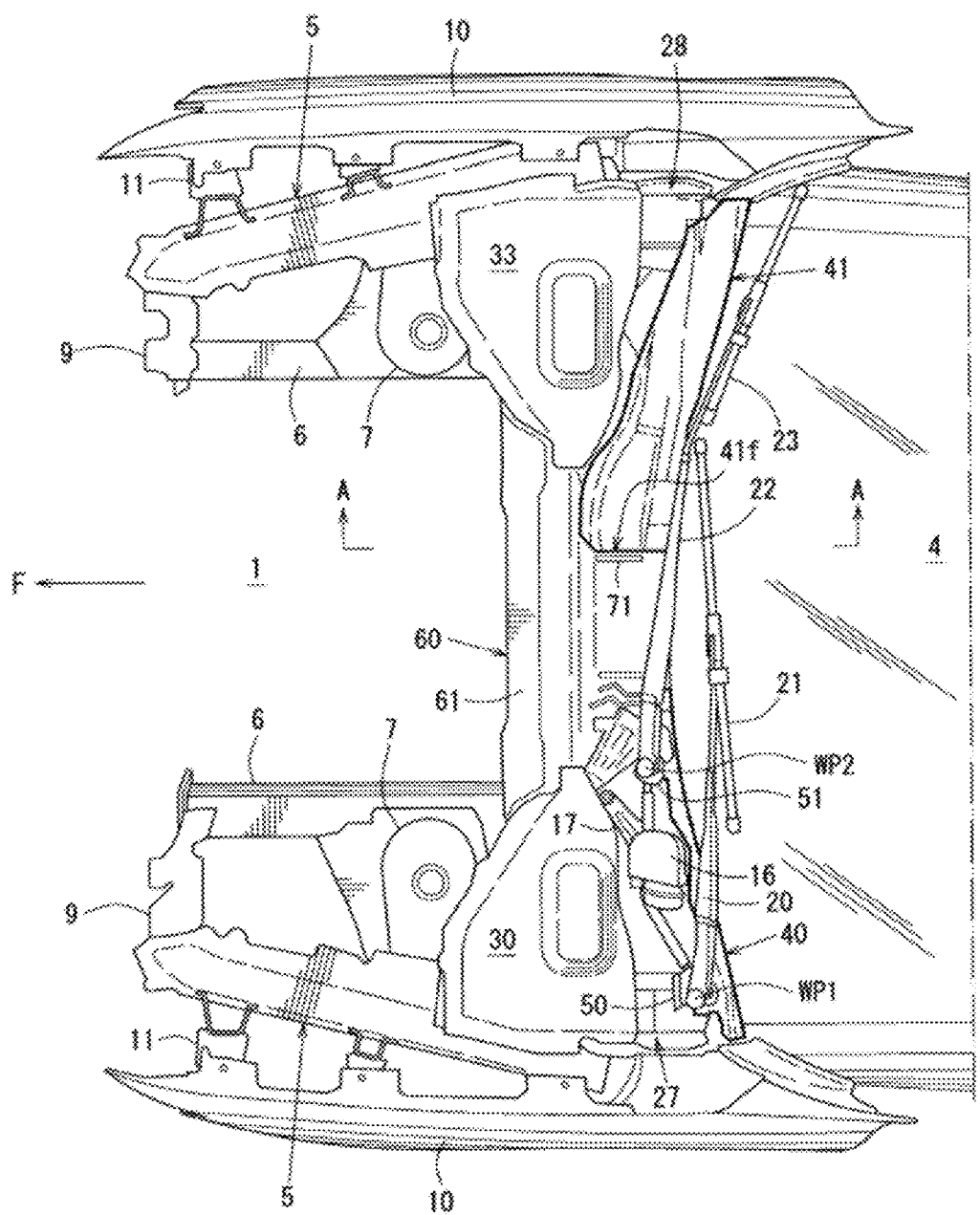
FIG. 2 is a plan view of the vehicle front portion in which a cowl grille has been removed from FIG. 1.
Figure 3:
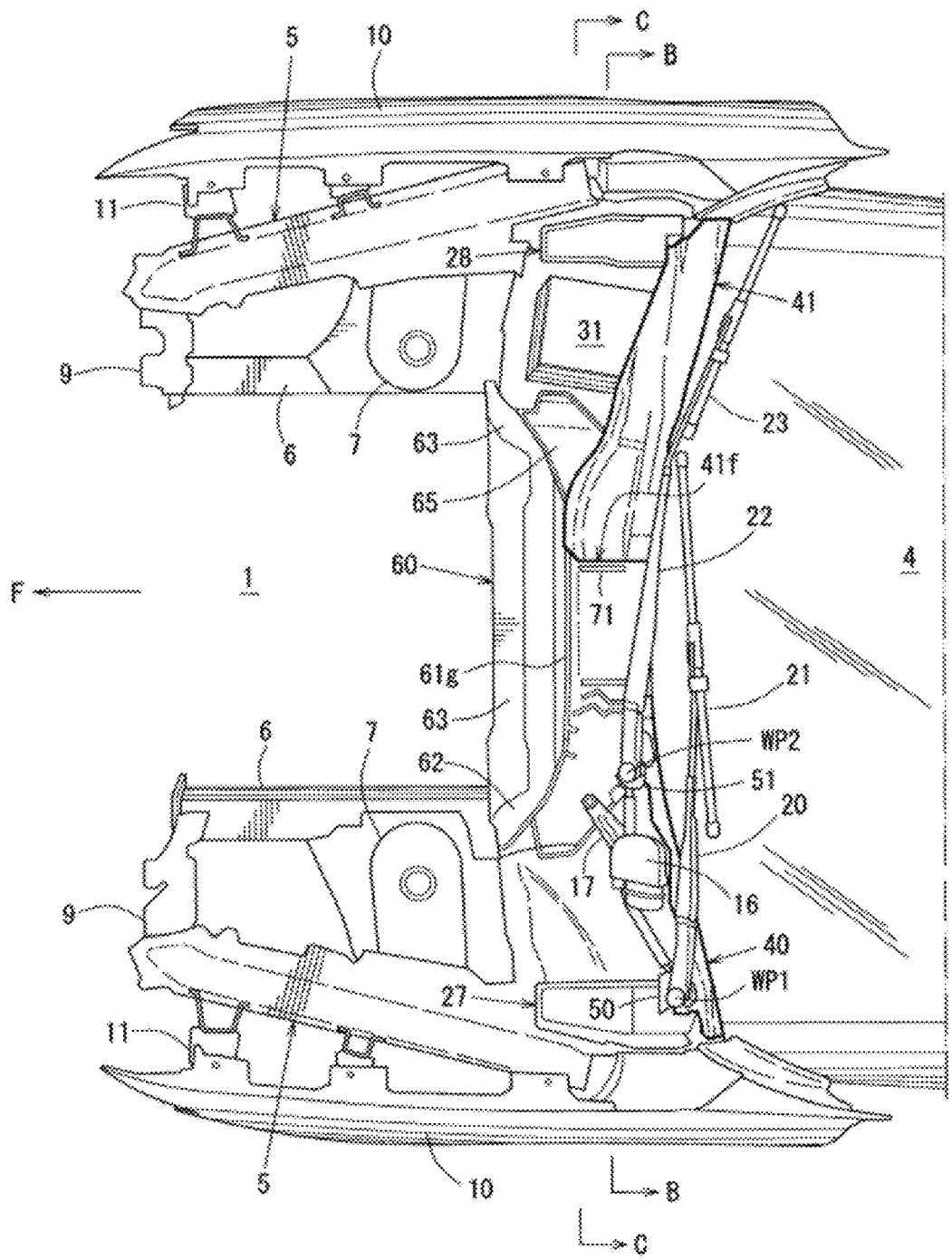
FIG. 3 is a plan view of the vehicle front portion in which a cover member has been removed from FIG. 2.
Figure 4:
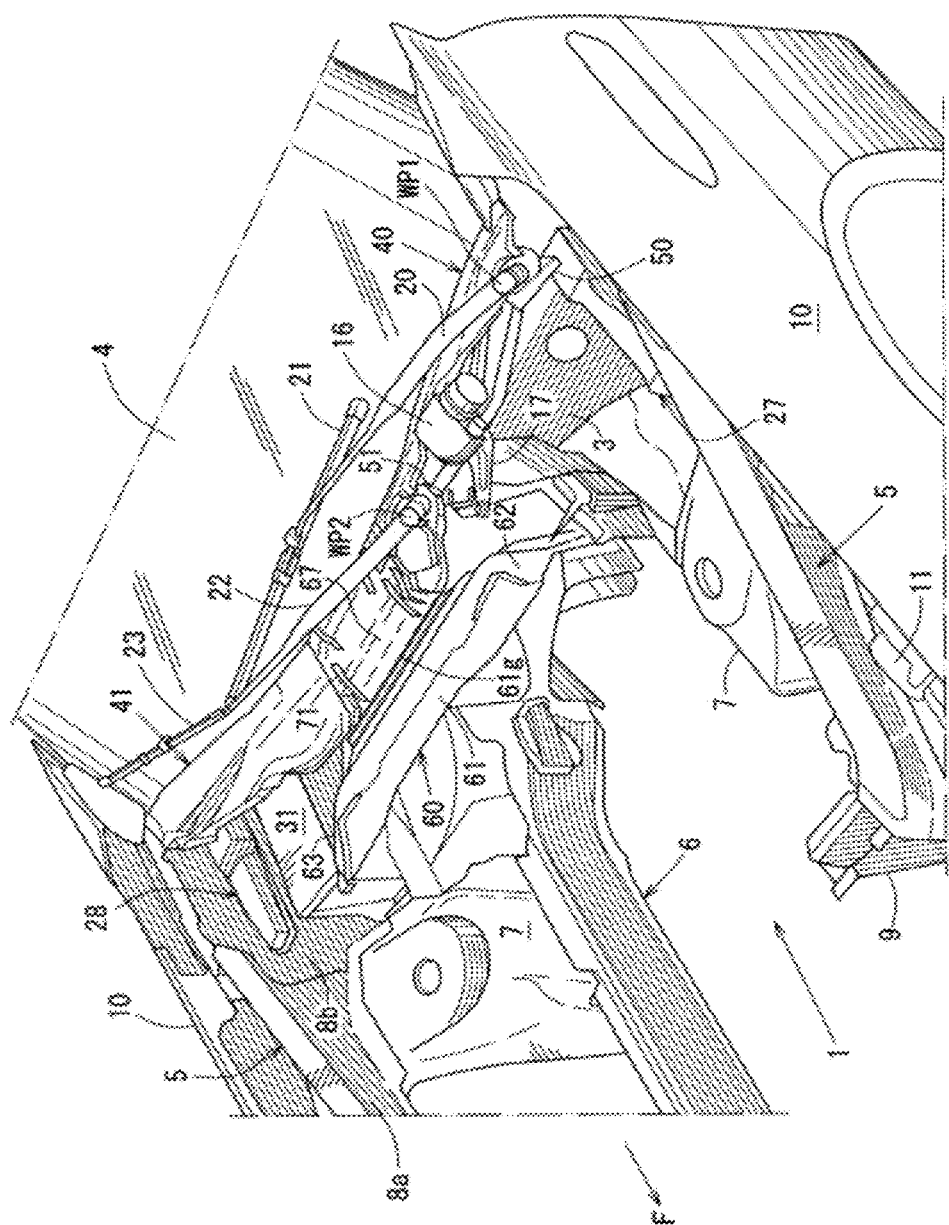
FIG. 4 is a perspective view of FIG. 3.
Figure 5:
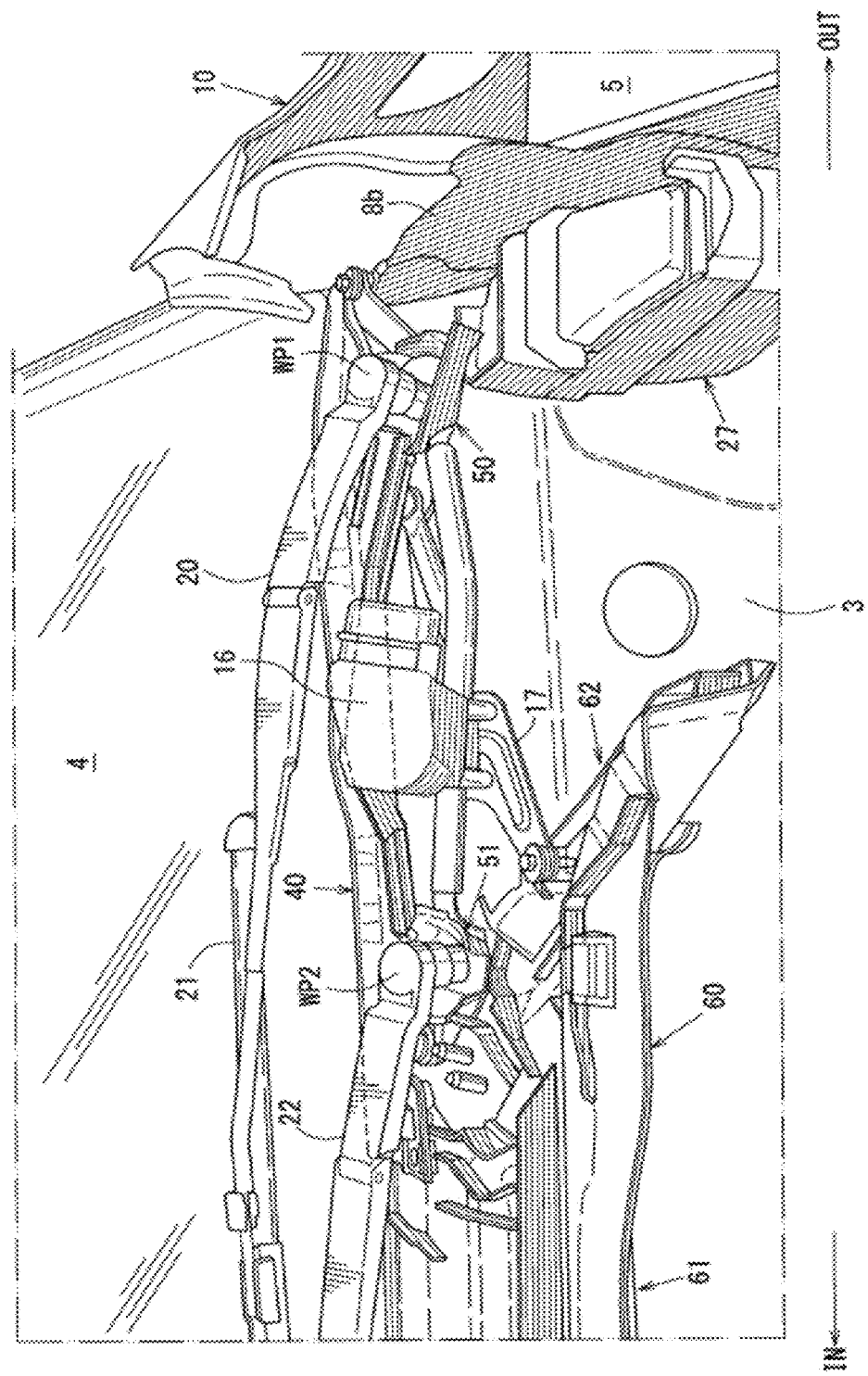
FIG. 5 is a front view illustrating a wiper motor and the surrounding structure thereof.
Figure 6:
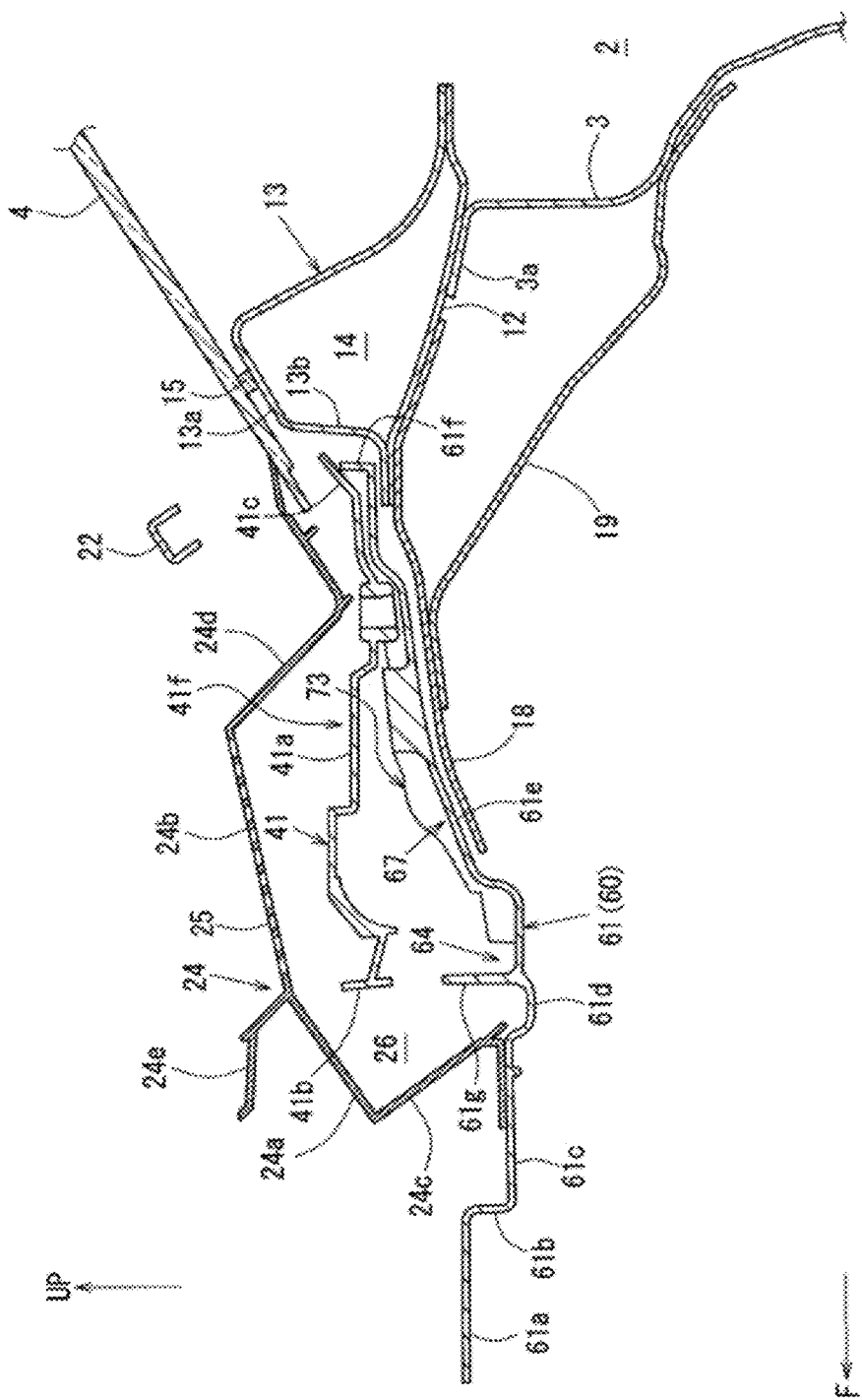
FIG. 6 is a sectional view seen along arrows A in FIG. 2.
Figure 7:
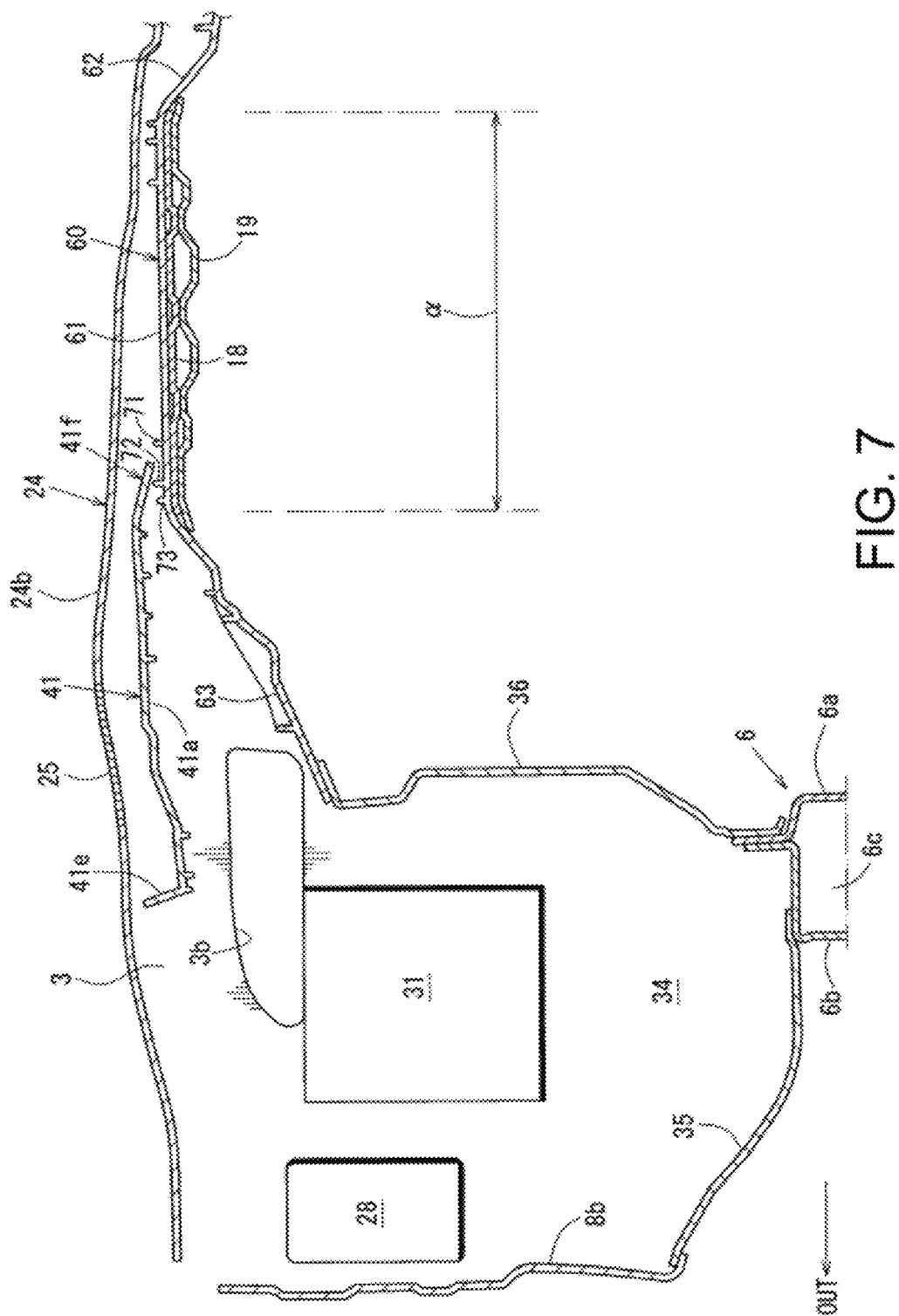
FIG. 7 is a sectional view of a half portion on the vehicle right side seen along arrows B in FIG. 3.
Figure 8:
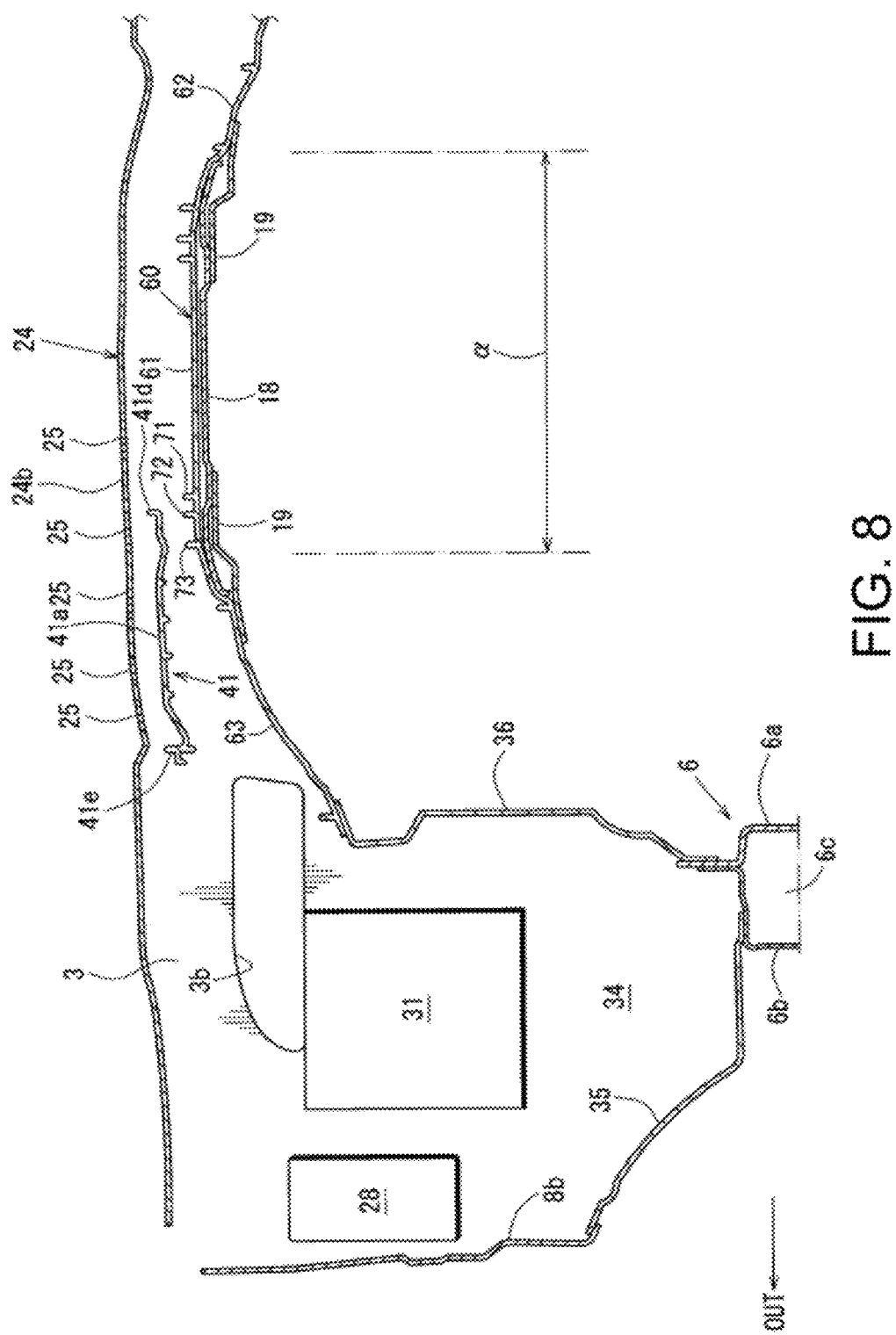
FIG. 8 is a sectional view of the half portion on the vehicle right side seen along arrows C in FIG. 3.

In addition, FIG. 4 is a perspective view of FIG. 3, FIG. 5 is a front view illustrating a wiper motor and the surrounding structure thereof, and FIG. 6 is a sectional view seen along arrows A in FIG. 2. Furthermore, FIG. 7 is a sectional view of a half portion on the vehicle right side seen along arrows B in FIG. 3 and FIG. 8 is a sectional view of the half portion on the vehicle right side seen along arrows C in FIG. 3.

Before the front structure of a vehicle is described, a front body structure will be first described. As illustrated in FIGS. 6 and 7, there is provided a dash lower panel 3 as a dash panel that separates an engine compartment 1 (see FIGS. 1 to 4) from a vehicle interior 2 in the vehicle front-rear direction. This dash lower panel 3 extends in the vehicle width direction and the left and right end portions in the vehicle width direction of the dash lower panel 3 are coupled to hinge pillars.

The hinge pillars described above are erected so as to extend in the vehicle vertical direction. Each of the hinge pillars is the vehicle body strengthening member that joins and fixes a hinge pillar inner and a hinge pillar outer to each other and has a hinge pillar closed cross-section extending in the vehicle vertical direction.

The lower end portion of the hinge pillar described above is provided with a side sill extending from the lower end portion to the vehicle rear. This side sill is the vehicle body strengthening member that joins and fixes a side sill inner and a side sill outer to each other and has a side sill closed cross-section extending in the vehicle front-rear direction.

In addition, the upper end portion of the hinge pillar described above is provided with a front pillar extending backward and diagonally upward from the upper end portion. This front pillar is the vehicle body strengthening member that joins and fixes a front pillar inner and a front pillar outer to each other and has a front pillar closed cross-section extending diagonally rear upward of the vehicle.

As illustrated in FIGS. 1 to 4, a front windshield 4 (so-called front window glass) is provided in an opening, which is surrounded and formed by a pair of left and right front pillars, a front header disposed on the front side of the upper portion of the vehicle, and a cowl panel 13 described later, in which the front windshield is disposed.

Here, the dash lower panel 3 described above is the panel member that is located in the lower end portion of the front windshield 4 and separates the engine compartment 1 from the vehicle interior 2 in the vehicle front-rear direction while extending in the vehicle width direction, as illustrated in FIG. 6.

On the other hand, as illustrated in FIGS. 1 to 4, a pair of left and right apron reinforcements 5 extending to the vehicle front from the front portions of the upper ends of the left and right hinge pillars described above are provided in front portions of the upper ends. As illustrated in FIGS. 1 to 4, there is provided a pair of left and right front side frames 6 extending to the vehicle front from both ends in the vehicle width direction of the dash lower panel 3. The front side frames 6 are located on the inner side in the vehicle width direction and on the lower side in the vehicle vertical direction of the apron reinforcements 5 described above.

In addition, as illustrated in FIGS. 7 and 8, each of the front side frames 6 described above is the vehicle body strengthening member that joins and fixes a front side frame inner 6a and a front side frame outer 6b to each other and has a front side frame closed cross-section 6c extending in the vehicle front-rear direction.

As illustrated in FIGS. 1 to 4, there is provided suspension tower portions 7 that project upward while being fixed to the front side frames 6 described above and support the upper portions of the dampers of front suspension devices. As illustrated in FIG. 4, each of the suspension tower portions 7 is mounted across a front side panel 8a constituting the inner side surface of the apron reinforcement 5 and the front side frame 6 described above. Here, strut tower portions may be adopted as the suspension tower portions 7 described above. Rear side panels 8b are provided so as to be continuous with the front side panels 8a described above in the vehicle front-rear direction (see FIG. 4).

As illustrated in FIGS. 1 to 4, there are provided coupling members 9 that couple the front end portions of the front side frames 6 and the front portions of the apron reinforcements 5 to each other in the vehicle vertical direction in the front end portions of the front side frames 6.

On the other hand, as illustrated in FIGS. 1 to 4, the left and right side portions in the vehicle width direction of the engine compartment 1 described above are covered with front fender panels 10. In addition, a bonnet covers the engine compartment 1 described above from above with in an openable and closable manner.

Here, as illustrated in FIGS. 1 to 3, the front fender panel 10 described above is fixed to the apron reinforcement 5 with a plurality of mounting members 11. In addition, the bonnet described above includes a bonnet outer panel and a bonnet inner panel and the bonnet outer panel is integrated with the bonnet inner panel by hemming the peripheral portion of the bonnet outer panel.

As illustrated in FIG. 6, an upper end bent portion 3a is integrally formed at the upper end of the dash lower panel 3 described above, and an air inlet 3b (see FIGS. 7 and 8) that takes in air for air conditioning is opened and formed on one end side (the right end side in the vehicle width direction in this example) in the vehicle width direction.

As illustrated in FIG. 6, an upper end bent portion 3a of the dash lower panel 3 described above is provided with the cowl panel 13 having a substantially hat-shaped cross-section via a dash upper panel 12. A cowl closed cross-section 14 extending in the vehicle width direction is formed between the cowl panel 13 and the dash upper panel 12 described above to improve the rigidity of the cowl portion.

As illustrated in FIG. 6, the front windshield 4 described above is attached to an upper wall portion 13a, which is inclined in a front-low-back-high manner, of the cowl panel 13 described above via an adhesive 15.

As illustrated in FIGS. 2 to 5, the wiper motor 16 as the electrical component is provided below the left portion in the vehicle width direction of the front windshield 4 described above. This wiper motor 16 is supported by a wiper motor support bracket 17 illustrated in FIG. 5. In addition, as illustrated in FIG. 5, the wiper motor 16 described above is disposed between a pair of wiper pivots WP1 and WP2 spaced apart from each other in the vehicle width direction.

As illustrated in FIGS. 1 to 4, a wiper blade 21 is attached to one wiper pivot WP1 located on the left end side in the vehicle width direction via a wiper arm 20 and a wiper blade 23 is attached to the other wiper pivot WP2 located on the inner side in the vehicle width direction of the wiper pivot WP1 via a wiper arm 22.

When the wiper motor 16 described above is driven, the left and right wiper blades 21 and 23 are driven simultaneously about the pair of the wiper pivot WP1 and WP2 as the fulcrums via the left and right wiper arms 20 and 22 to wipe out the front windshield 4.

As illustrated in FIG. 1, a cowl grille 24 located toward the vehicle front from the dash lower panel 3 is provided below (diagonally below the front windshield 4 in this example) the front windshield 4 and above the wiper motor 16.

As illustrated in FIG. 1, this cowl grille 24 extends across substantially the entire width in the vehicle width direction. In addition, as illustrated in FIG. 6, this cowl grille 24 includes front and rear upper surface portions 24a and 24b, front and rear vertical wall portions 24c and 24d, and a cowl seal mount portion 24e on which a cowl seal is mounted.

Furthermore, as illustrated in FIG. 1, in an upper surface portion 24b behind the cowl grille 24 described above, an outside air introduction hole 25 having a mesh structure is opened and formed in a portion shifted to the right in the vehicle width direction from the middle portion in the vehicle width direction. The outside air introduction hole 25 described above is formed at a position away from the air inlet 3b of the dash lower panel 3 to the inner side in the vehicle width direction, which is the other end side in the vehicle width direction, as illustrated in FIGS. 7 and 8.

As illustrated in FIGS. 1 and 3, in front of the left portion in the vehicle width direction of the cowl grille 24, there is provided a cover member 30 (see FIG. 1) that covers, from above, a reservoir tank as one of the auxiliaries and a fuse box storage case 27 that houses a fuse box as one of the auxiliaries.

In addition, as illustrated in FIGS. 1 and 3, in front of the right portion in the vehicle width direction of the cowl grille 24, there is provided a cover member 33 (see FIG. 1) that covers, from above, a battery 31 as one of the auxiliaries and a fuse box storage case 28 that houses the fuse box as one of the auxiliaries. As illustrated in FIG. 6, there is provided a drain member 60 that forms a closed cross-section 26 extending in the vehicle width direction in cooperation with the cowl grille 24 below the cowl grille 24.

As illustrated in FIGS. 2, 3, and 4, cowl centers 40 and 41 as left and right gutter members are provided spaced apart from each other in the middle portion in the vehicle width direction below the front windshield 4. These cowl centers 40 and 41 are the rain gutter members that receive the water dripping from the front windshield 4. Both the left and right cowl centers 40 and 41 are disposed in the closed cross-section 26 between the cowl grille 24 and the drain member 60 (see FIG. 6).

FIG. 6 illustrates only the cowl center 41 on the vehicle right side, but the left and right cowl centers 40 and 41 are provided so as to extend from the front wall portion 13b of the cowl panel 13 to the vehicle front. The cowl center 40 on the vehicle left side is provided immediately behind the wiper motor 16 (electrical component) described above as illustrated in FIGS. 2 to 5.

In FIGS. 6 to 8, reference numeral 18 indicates a cowl reinforcement upper extending from the dash upper panel 12 to the vehicle front and reference numeral 19 indicates a cowl reinforcement lower extending from the upper portion of the dash lower panel 3 to the vehicle front.

Figure 9:
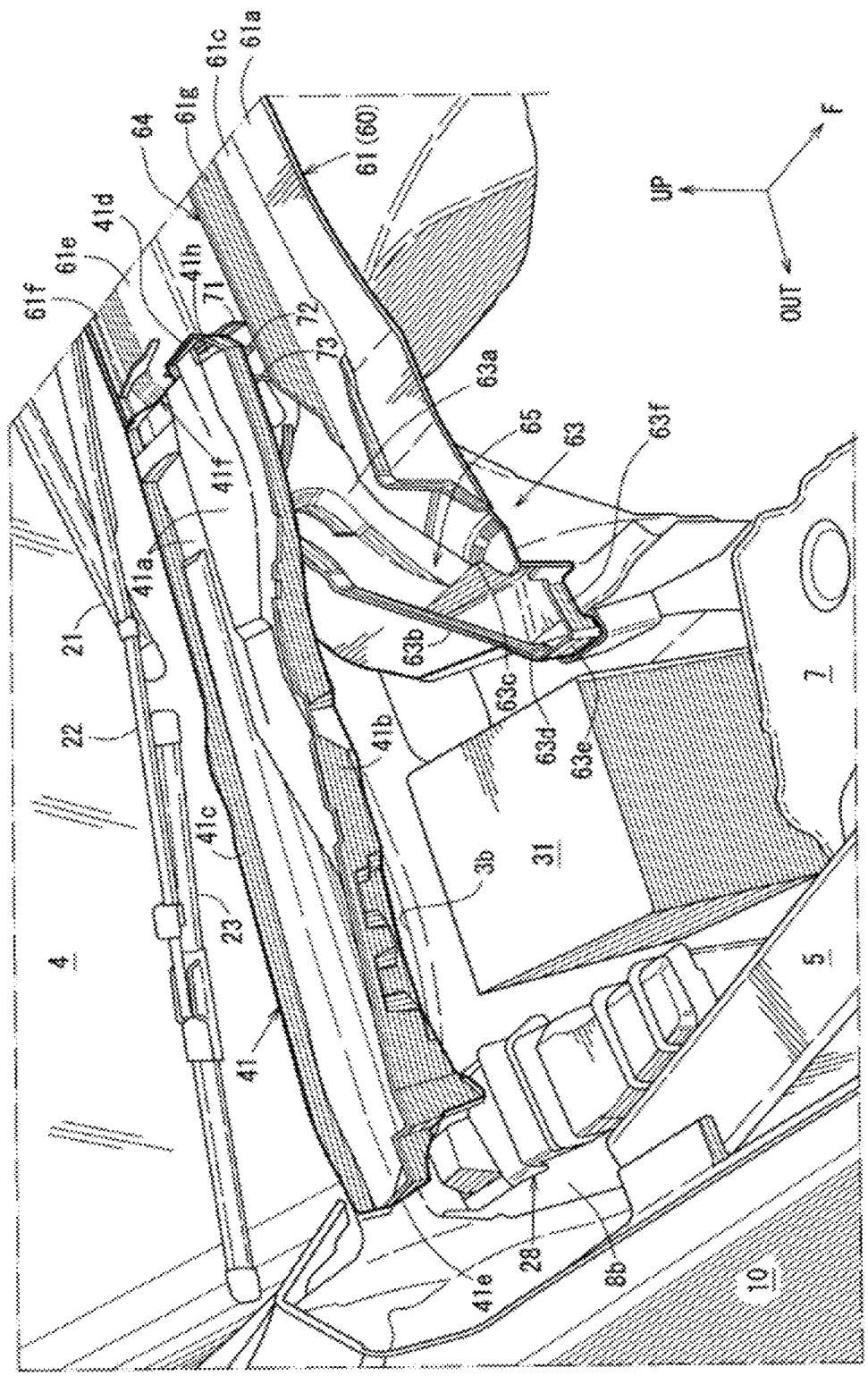
FIG. 9 is a perspective view of a main portion on the vehicle right side in FIG. 3.
Figure 10:
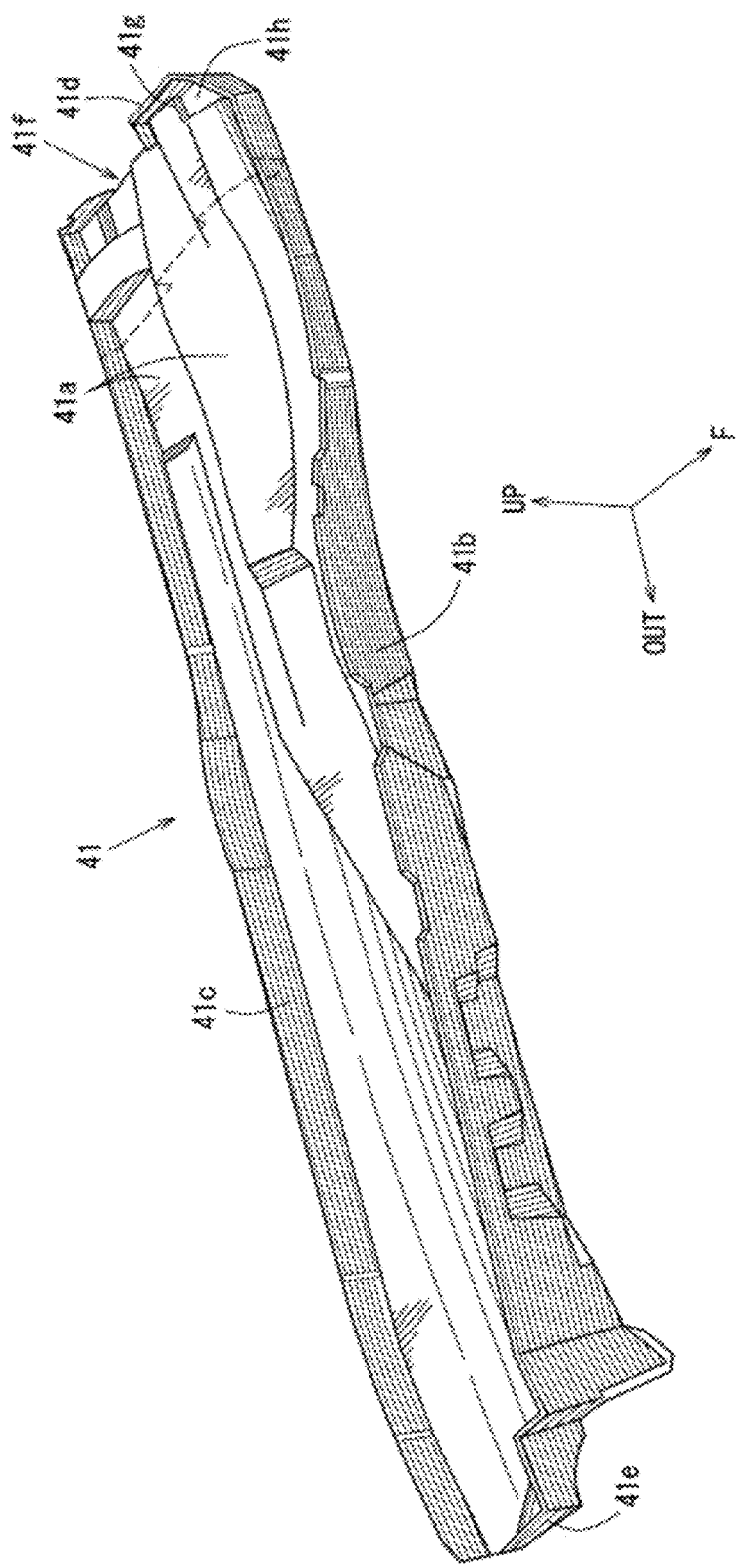
FIG. 10 is a perspective view illustrating only a cowl center on the vehicle right side in FIG. 9.
Figure 11:
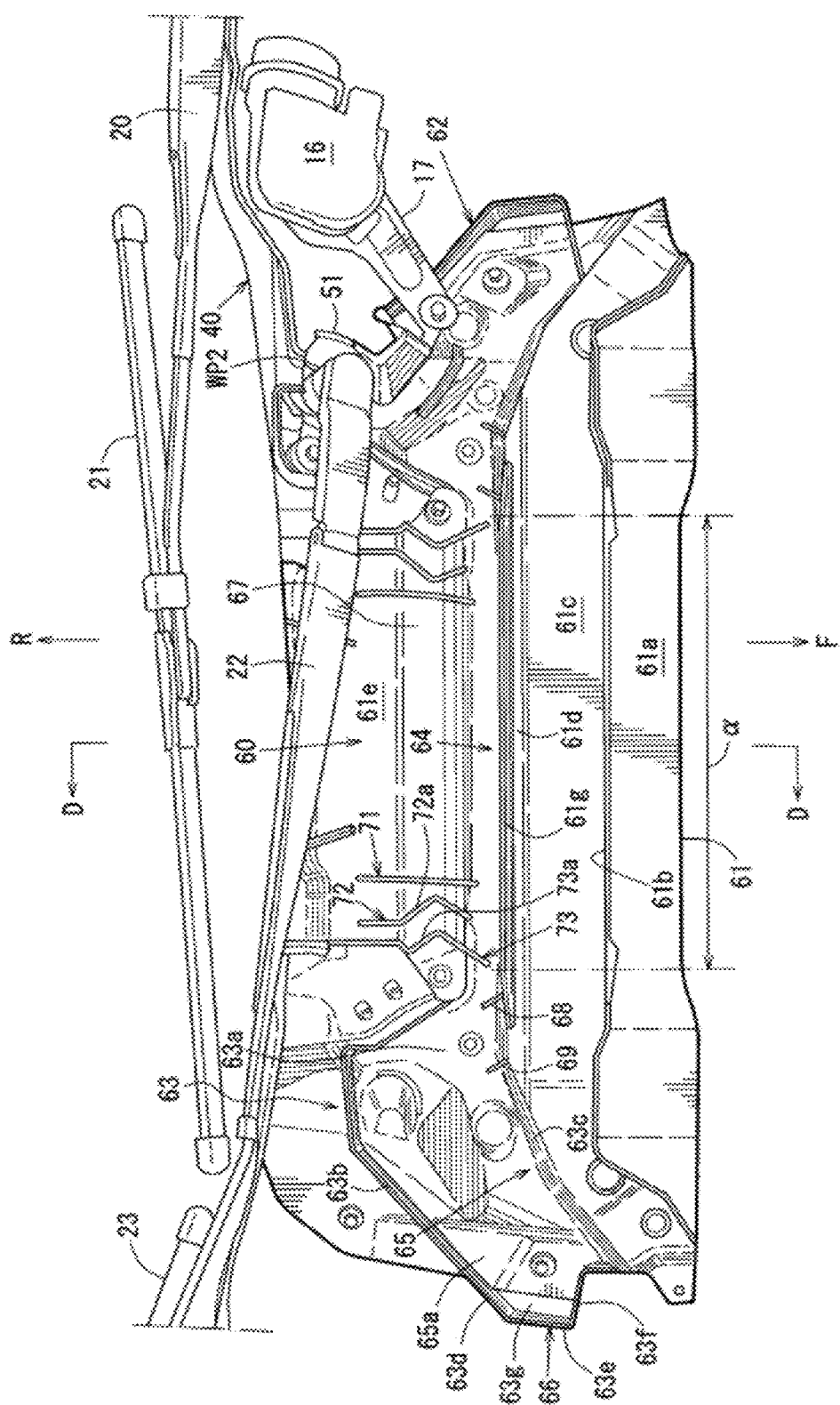
FIG. 11 is a plan view of the main portion in which the cowl center on the vehicle right side has been removed from FIG. 3.
Figure 12:
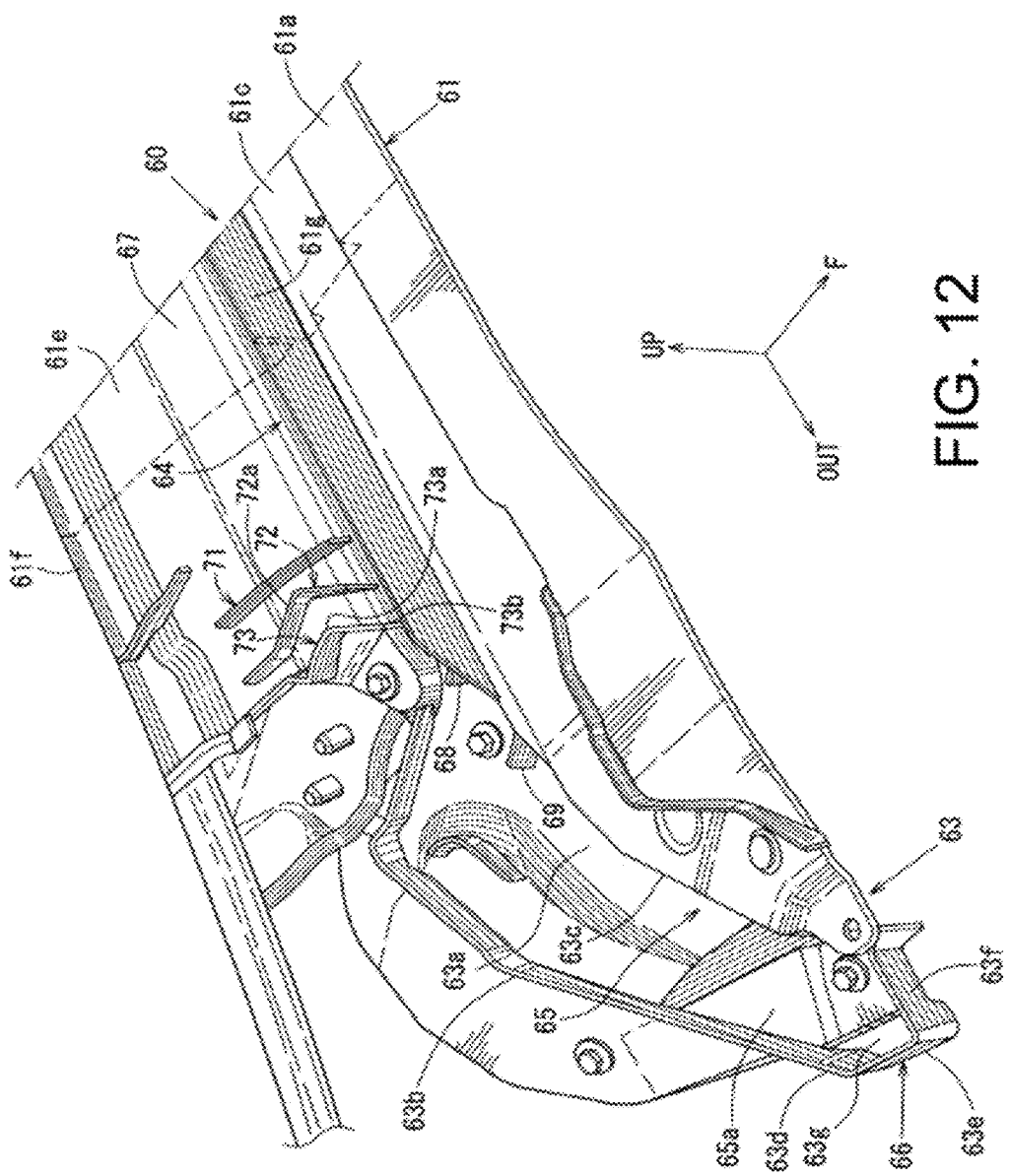
FIG. 12 is an enlarged perspective view of the vehicle right side in FIG. 11.
Figure 13:
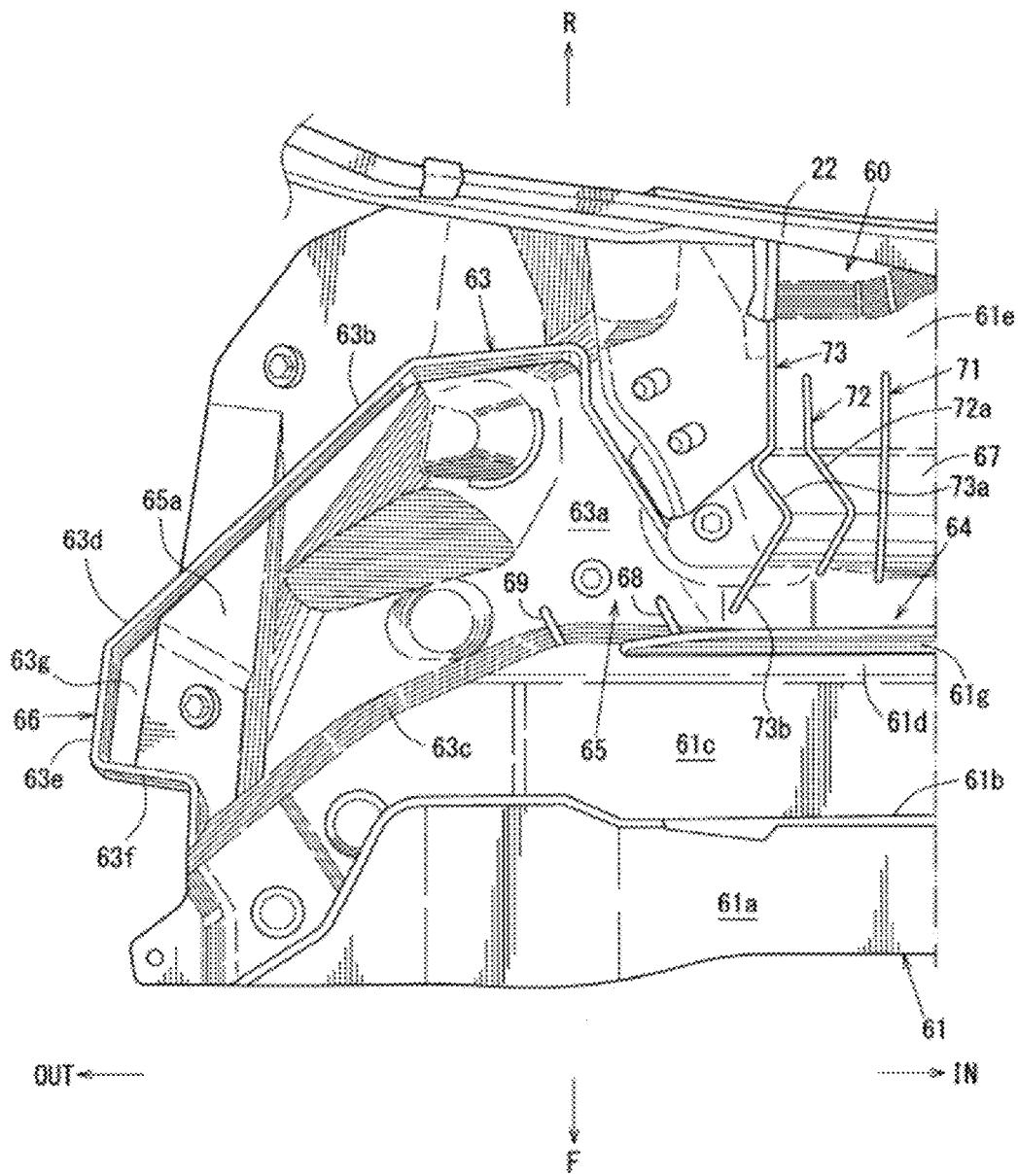
FIG. 13 is an enlarged plan view of the vehicle right side in FIG. 11.
Figure 14:
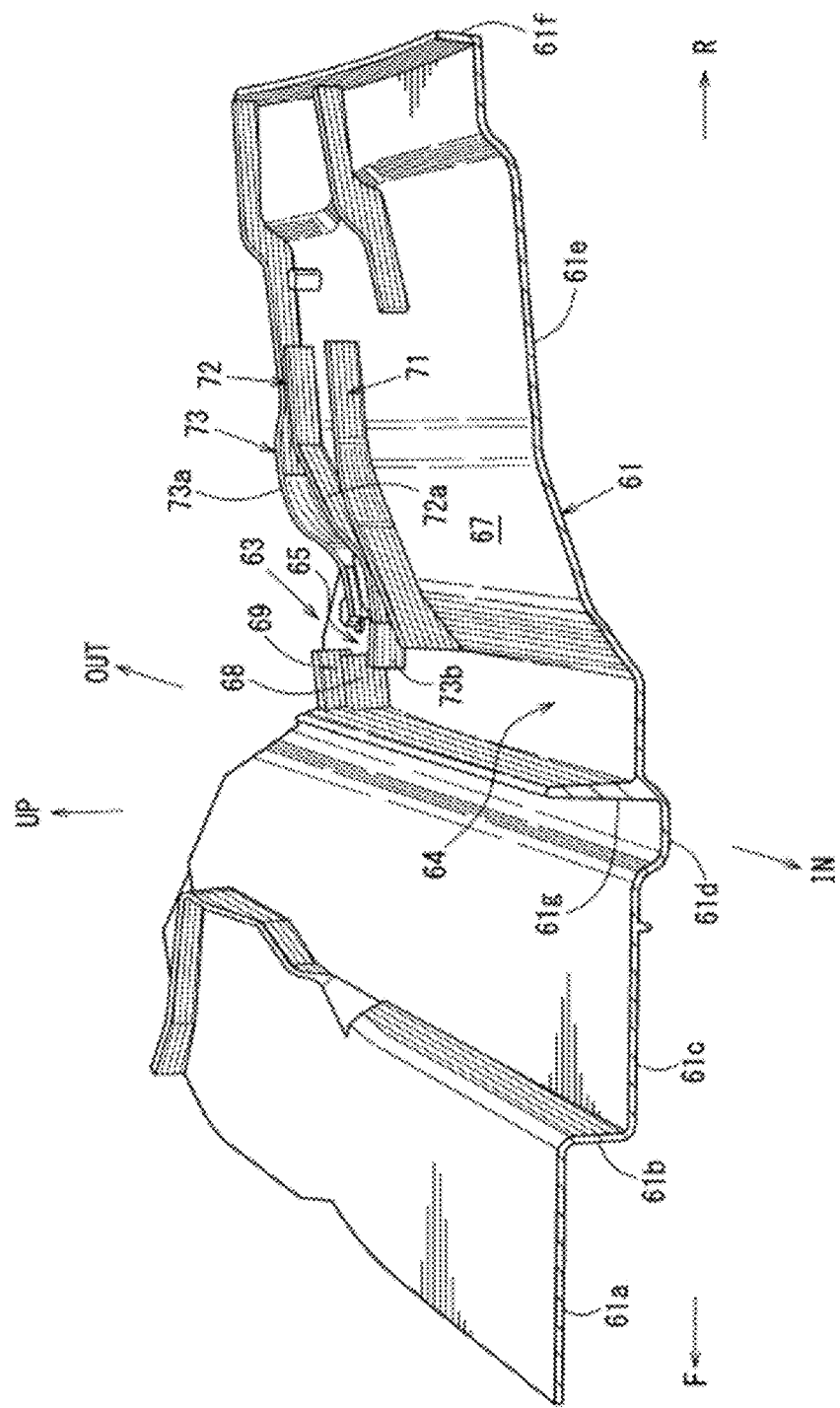
FIG. 14 is a perspective view seen along arrows D in FIG. 11.

FIG. 9 is a perspective view of a main portion on the vehicle right side in FIG. 3, FIG. 10 is a perspective view illustrating only a cowl center 41 on the vehicle right side in FIG. 9, and FIG. 11 is a plan view of the main portion in which the cowl center 41 on the vehicle right side has been removed from FIG. 3. In addition, FIG. 12 is an enlarged perspective view of the vehicle right side in FIG. 11, FIG. 13 is an enlarged plan view of the vehicle right side in FIG. 11, and FIG. 14 is a perspective view seen along arrows D in FIG. 11.

As illustrated in FIG. 5, the wiper motor 16 is located between the pair of wiper pivots WP1 and WP2 and the wiper pivots WP1 and WP2 have catch pans 50 and 51 as pivot drain paths that drain the water drops dripping from the flow path portion of the cowl center 40 downward.

The catch pans 50 and 51 form part of the drain route.

The cowl center 41 located on the right side in the vehicle width direction is configured as illustrated in FIGS. 7 to 10. That is, the cowl center 41 includes a bottom wall 41a extending in the vehicle width direction, a front wall 41b rising upward from the front portion of the bottom wall 41a, a rear wall 41c extending backward and upward from the rear portion of the bottom wall 41a, an inner wall 41d rising upward from the front portion of the inner end in the vehicle width direction of the bottom wall 41a, and an outer wall 41e rising upward from the outer end in the vehicle width direction of the bottom wall 41a.

A drain portion 41f that drains water to the drain member 60 is formed at the inner end portion in the vehicle width direction of the cowl center 41, that is, at a position away from the air inlet 3b of the dash lower panel 3 to the inner side in the vehicle width direction (see FIGS. 7 and 10). This drain portion 41f is formed in an inclined shape that lowers downward toward the inner side in the vehicle width direction.

In addition, as illustrated in FIG. 10, an opening 41h for drainage is formed between the inner wall 41d described above and a notch portion 41g of the bottom wall 41a. Furthermore, the drain portion 41f described above is provided in the middle portion in the vehicle width direction or in the vehicle left portion (right side in the drawing) as the other end side in the middle portion in the vehicle width direction as illustrated in FIG. 7 so as to ensure the distance in the vehicle width direction between the air inlet 3b of the dash lower panel 3 and the drain portion 41f.

In contrast, the drain member 60 described above extends in the vehicle width direction as illustrated in FIGS. 7 and 8, and this drain member 60 has a top deck portion 61 located thereon at the position at which this drain member 60 overlaps with the outside air introduction hole 25 in vehicle plan view as illustrated in these drawings. This top deck portion 61 is formed over a predetermined range in the vehicle width direction indicated by an arrow a in FIGS. 7 and 8.

On the longitudinal side of the drain member 60 described above, that is, on both the left and right sides of the top deck portion 61 described above of the drain member 60, there are formed inclined portions 62 and 63 that are inclined downward toward the outer side in the vehicle width direction.

As illustrated in FIG. 7, the drain portion 41f described above of the cowl center 41 on the vehicle right side is provided at substantially the same position in the vehicle width direction as the top deck portion 61 of the drain member 60.

Accordingly, the drain portion 41f of the cowl center 41 is vertically close to the top deck portion 61 of the drain member 60 and water is drained from the drain portion 41f of the cowl center 41 to the top deck portion 61 of the drain member 60 that is vertically close to the drain portion 41f of the cowl center 41, so droplets are not easily generated.

In addition, since the drain portion 41f of the cowl center 41 is away from the air inlet 3b of the dash lower panel 3 in the vehicle width direction, even if droplets are generated, the droplets are prevented from being entrained in the air flowing in the closed cross-section 26.

Furthermore, the drain portion 41f of the cowl center 41 and the top deck portion 61 of the drain member 60 are present at positions at which these portions overlap with the outside air introduction hole 25 in vehicle plan view, the pressure in the closed cross-section 26 in the formation region of the outside air introduction hole 25 is the same as that of the outside air, and the flow speed of air is the slowest in the closed cross-section 26. Since water is drained to the top deck portion 61 where the pressure is the same as that of the outdoor air and the flow speed of air is low as described above, even if droplets are generated, the droplets can be further prevented from being entrained in an air flow in the closed cross-section 26.

Furthermore, as illustrated in FIGS. 7 and 8, since the inclined portion 63 of the drain member 60 is inclined downward toward the outer side in the vehicle width direction and the upper surface of this inclined portion 63 is located downward toward the air inlet 3b of the dash lower panel 3, the entrainment of droplets is further suppressed.

The cross-sectional structure of the top deck portion 61 of the drain member 60 described above is configured as illustrated in FIGS. 6 and 14. That is, an intermediate flange 61c is coupled to the rear end of a front flange 61a via a vertical wall 61b, a bottom wall 61e is coupled to the rear portion of this intermediate flange 61c via a concave wall portion 61d, and a rear wall 61f rising upward is integrally coupled to the rear portion of the bottom wall 61e.

In addition, a partition wall 61g rising upward is integrally formed at the boundary portion between the concave wall portion 61d and the bottom wall 61e described above, and a flow path portion 64 that extends in the vehicle width direction and serves as a path through which water flows is formed between this partition wall 61g and the front portion of the bottom wall 61e.

As illustrated in FIG. 12, the inclined portion 63 described above has a flow path portion 65, close to the inclined portion 63, that communicates with the flow path portion 64 formed by a bottom wall 63a, a rear wall 63b rising upward from the rear portion of the bottom wall 63a, a wall portion 63c, formed in the front of the bottom wall 63a, that is continuous with the concave wall portion 61d of the top deck portion 61. This flow path portion 65 extends in the vehicle width direction along the inclined portion 63 and forms a path through which water flows.

As illustrated in FIG. 12, the drain member 60 described above has a drain duct 66 in the outer end portion of the inclined portion 63. That is, the drain duct 66 described above is configured by surrounding the downstream portion 65a of the flow path portion 65 described above by an extension portion 63d of the rear wall 63b described above, a side wall 63e, and a front wall 63f and forming a flow down hole 63g between the downstream portion 65a and the elements 63d, 63e, and 63f described above. The generation of droplets is further suppressed reliably by ensured the flow path (see the flow down hole 63g) using the drain duct 66 described above.

As illustrated in FIGS. 11 to 14, the flow path portions 64 and 65 are provided with a plurality of first ribs 68, 69, and 73b as the air speed reduction portion that reduces the flow speed of the air flowing through the flow path portions 64 and 65 in the region ranging from the position that overlaps with the outside air introduction hole 25 (see FIG. 1) in the vehicle width direction to the air inlet 3b of the dash lower panel 3.

In this example, as illustrated in FIGS. 11 to 14, the first ribs 68 and 69 described above are formed so as to rise upward from the bottom surface of the flow path portion 65 of the inclined portion 63 close to the top deck portion 61, and the first rib 73b is formed so as to rise upward from the bottom surface of the flow path portion 64. However, the range in which the first ribs 68 and 69 are formed is not limited to the positions in the example as long as the range is within the region ranging from the position that overlaps with the outside air introduction hole 25 to the air inlet 3b.

The plurality of first ribs 68, 69, and 73b described above are spaced apart in the vehicle width direction as illustrated in FIGS. 11 to 14, the front ends of the two first ribs 68 and 69 of these first ribs 68, 69, and 73b are in contact with the wall portion 63c, and the lower ends of the first ribs 68 and 69 are in contact with the upper surface of the flow path portion 65. In addition, the first rib 73b is provided at the front end of a second rib 73 described later.

The first ribs 68, 69, and 73b as the air speed reduction portion cause air resistance in the space above the flow path portion 65, reduce the speed of the air flowing in the closed cross-section 26 (see FIG. 6), and prevent the droplets thrown up by the air from being entrained to the air inlet 3b of the dash lower panel 3.

That is, even if the area of the closed cross-section 26 formed by the cowl grille 24 and the drain member 60 is small, it is possible to prevent the water in the drain member 60 from being thrown up by high-speed air and prevent the droplets from being entrained to the air inlet 3b of the dash lower panel 3.

As illustrated in FIGS. 11 to 14 especially in FIG. 14, the plurality of first ribs 68, 69, and 73b extending in the vehicle front-rear direction are spaced apart in the vehicle width direction in the flow path portions 65 and 64. The plurality of first ribs 68, 69, and 73b act as the air speed reduction portion and are provided so as to partially overlap with each other in vehicle side view.

Accordingly, the plurality of first ribs 68, 69, and 73b serve as resistance to the air flowing in the closed cross-section 26 in the vehicle width direction, thereby suppressing the entrainment of droplets to the air inlet 3b of the dash lower panel 3.

As illustrated in FIG. 13, the plurality of first ribs 68, 69, and 73b described above extend from the front ends or the rear ends of the flow path portions 65 and 64 toward the middle portions of the flow path portions so as not to block the flow path portions 65 and 64 in the flow path width in the vehicle front-rear direction of the flow path portions 65 and 64, and are inclined toward the outer side in the vehicle width direction toward the middle portions of the flow path portions. That is, in this example, the two first ribs 68 and 69 of the plurality of first ribs 68, 69, and 73b are formed so as to be inclined toward the outer side in the vehicle width direction in the range from the front ends to the rear ends thereof.

Accordingly, a flow of water flowing at a high flow speed in closed cross-section 26 (see FIG. 6) is inhibited by the first ribs 68, 69, and 73b while a flow of water flowing at a low flow speed in the flow path portions 65 and 64 is not inhibited, further suppressing the entrainment of droplets to the air inlet 3b by reducing the speed of the air.

Although the angle in plan view formed by a wall portion 63c in the flow path portion 65 upstream of the first ribs 68 and 69 and the first ribs 68 and 69 is set to 115 to 120 degrees as illustrated in FIG. 13 in this example, the angle is not limited to the values.

In addition, as illustrated in FIG. 13, the plurality of first ribs 68, 69, and 73b include the front ribs (see the first ribs 68 and 69) extending from the front end of the flow path portion 65 to the middle portion of the flow path portion 65 within the flow path width in the vehicle front-rear direction and the rear rib (see the first rib 73b) that is spaced apart in the vehicle width direction from the front ribs and extends from the rear end of the flow path portion 64 to the middle portion of the flow path portion 64, and the front ribs and the rear rib partially overlap with each other in vehicle side view.

This causes the first ribs 68, 69, and 73b to partition the space above the flow path portions 65 and 64 in vehicle side view in the width direction to reduce the speed of the air to be introduced to the air inlet 3b (see FIG. 7) more effectively.

As illustrated in FIGS. 6 and 14, the drain member 60 described above has the slope-shaped portion 67 extending from the rear end in the vehicle front-rear direction of the flow path portion 64 upward toward the vehicle rear, and a plurality of second ribs 71, 72, and 73 extending in the vehicle front-rear direction are provided at positions on the slope-shaped portion 67 that correspond to the inner end portion in the vehicle width direction of the cowl center 41 so as to be spaced apart in the vehicle width direction.

Accordingly, while the water flowing through the slope-shaped portion 67 flows downward to the flow path portion 64, the speed of the air flowing in the vehicle width direction in the closed cross-section 26 (see FIG. 6) above the water in the slope-shaped portion 67 is reduced by the second ribs 71, 72, and 73 described above. As a result, the entrainment of droplets to the air outlet 3b of the dash lower panel 3 illustrated in FIGS. 7 and 8 is further suppressed.

Specifically, as illustrated in FIG. 7, the bottom wall 61e of the drain member 60 described above that vertically corresponds to the drain portion 41f of the cowl center 41 described above is provided with the slope-shaped portion 67 that is inclined from the rear end of the flow path portion 64 toward the vehicle rear. This causes the water dripping from the drain portion 41f of the cowl center 41, which is the gutter member, onto the slope-shaped portion 67 of the drain member 60 to flow down from the rear portion to the front portion along the slope-shaped portion 67 and reach the flow path portion 64.

In addition, the plurality of ribs 71, 72, and 73 extending in the vehicle front-rear direction while rising upwards from the slope-shaped portion 67 are provided on the slope-shaped portion 67 described above so as to be spaced apart in the vehicle width direction, as illustrated in FIGS. 12 and 13. The plurality of ribs 71, 72, and 73 reduce the momentum of the air flowing in the closed cross-section 26, thereby further increasing the effect of suppressing the entrainment of droplets.

In this example, a total of three second ribs 71, 72, and 73 are provided as illustrated in FIG. 13, in which one second rib 71 located on the innermost side in the vehicle width direction is provided substantially straight in the vehicle front-rear direction, while the remaining two second ribs 72 and 73 have slanting portions 72a and 73a described below, respectively.

That is, the slanting portions 72a and 73a described above are inclined to the inner side in the vehicle width direction toward the lower portion in the middle portions in the front-back direction of the second ribs 72 and 73, as illustrated in FIGS. 13 and 14.

This changes the direction of the water flowing through the slope-shaped portion 67 once to the inner side in the vehicle width direction by the slanting portions 72a and 73a to reduce the momentum of the water, thereby reducing the flow speed thereof. This suppresses the generation of droplets when the water flows from the slope-shaped portion 67 downward and meets the flow path portion 64. Furthermore, the water flowing through the slope-shaped portion 67 flows downward and meets the flow path portion 64 described above at the position away from the air inlet 3b (see FIGS. 7 and 8) of the dash lower panel 3 toward the inner side in the vehicle width direction.

The structures of the first ribs 68, 69, and 73b and the second ribs 71, 72, 73 on the vehicle right side have been described with reference to FIGS. 12 and 13. However, on the vehicle left side as well, as illustrated in FIGS. 4 and 11, a plurality of ribs are provided symmetrically with respect to the first ribs 68 and 69 and the second ribs 71, 72, and 73 on the vehicle right side.

By the way, as illustrated in FIGS. 7 and 8, the fuse box storage case 28 as one of the auxiliaries and an auxiliary placement space 34 that stores the battery 31 are enclosed by the cover member 33 (see FIG. 1), the rear side panel 8b, a wheel house 35 and an insulator 36.

The wheel house 35 described above is connected between the rear side panel 8b and the front side frame outer 6b. In addition, the insulator 36 described above is connected between the lower surface of the inclined lower end portion of the inclined portion 63 of the drain member 60 and the front side frame inner 6a.

The water dripping from the front windshield 4 flows as described below.

That is, the water dripping along the front windshield 4 is once caught by the cowl center 41 illustrated in FIG. 7. The water dripping onto the cowl center 41 flows down to the top deck portion 61 of the drain member 60 illustrated in FIG. 7 from the drain portion 41f at a position away from the air inlet 3b of the dash lower panel 3 in the vehicle width direction.

The water having flowed down to the top deck portion 61 reaches the flow path portion 64 (see FIG. 7) along the slope-shaped portion 67, flows through the drain duct 66 via the flow path portion 65 of the inclined portion 63 illustrated in this drawing from the flow path portion 64, and is discharged downward.

As illustrated in FIGS. 11 to 14, since the first ribs 68, 69, and 73b as the air speed reduction portion which reduces the speed of the air flowing through the flow path portions 64 and 65 described above are provided, the speed of the air flowing in the closed cross-section 26 (see FIG. 13) is reduced by the first ribs 68, 69, and 73b, thereby preventing the droplets thrown up by the air from being entrained to the air inlet 3b of the dash lower panel 3.

It should be noted that, in the drawing, arrow F indicates the vehicle front, arrow R indicates the vehicle rear, arrow IN indicates the inner side in the vehicle width direction, arrow OUT indicates the outer side in the vehicle width direction, and arrow UP indicates the vehicle upper side.

As described above, the front structure of a vehicle according to the example includes the dash panel (dash lower panel 3) that extends in the vehicle width direction and performs partitioning into the engine compartment 1 and the vehicle interior 2 in the vehicle front-rear direction; the air inlet 3b provided on one end side in the vehicle width direction of the dash panel (dash lower panel 3); the cowl grille 24 that has the outside air introduction hole 25 at the position away from the air inlet 3b toward the other end side in the vehicle width direction; and the drain member 60 provided below the cowl grille 24, the drain member 60 forming the closed cross-section 26 in cooperation with the cowl grille 24, in which the drain member 60 has the flow path portions 64 and 65 that extend in the vehicle width direction and serve as paths through which water flows, and the flow path portions 64 and 65 have the air speed reduction portion (first ribs 68 and 69) that reduces the flow speed of air flowing through the flow path portions 64 and 65 in the region ranging from the position that overlaps with the outside air introduction hole 25 in the vehicle width direction to the air inlet 3b (see FIGS. 1, 6, and 7 and FIGS. 11 to 14).

In this structure, air flows in the closed cross-section 26 in the vehicle width direction above the water flowing through the flow path portions 64 and 65 (see particularly the flow path portion 65) of the drain member 60. Since the air speed reduction portion (first ribs 68 and 69) causes air resistance in the space above the flow path portions 64 and 65, the speed (air speed) of the air flowing in the closed cross-section 26 is reduced by the air speed reduction portion (first ribs 68 and 69). As a result, it is possible to prevent the droplets thrown up by air from being entrained to the air inlet 3b of the dash panel (dash lower panel 3).

That is, even if the area of the closed cross-section 26 formed by the cowl grille 24 and the drain member 60 is small, it is possible to prevent the water in the drain member 60 from being thrown up by high-speed air and prevent the droplets from being entrained to the air inlet 3b of the dash panel (dash lower panel 3).

According to an embodiment of the present disclosure, the air speed reduction portion described above includes the plurality of first ribs 68 and 69, partially overlapping with each other in vehicle side view, that extend in the vehicle front-rear direction in the flow path portions 64 and 65 (see FIG. 14).

In this structure, the plurality of first ribs 68 and 69 serve as resistance to the air flowing in the closed cross-section 26 (see FIG. 6) in the vehicle width direction, thereby suppressing the entrainment of droplets to the air inlet 3b (see FIG. 7).

According to an embodiment of the present disclosure, the first ribs 68, 69, and 73b extend from the front end or the rear end of the flow path portions 64 and 65 toward the middle portions of the flow path portions within the flow path width in the vehicle front-rear direction of the flow path portions 64 and 65 and is inclined to the outer side in the vehicle width direction toward the middle portion of the flow path portions (see FIG. 13).

In this structure, a flow of water flowing at a high flow speed in the closed cross-section 26 can be inhibited by the first ribs 68, 69, and 73b while a flow of water flowing at a low flow speed is not inhibited, further suppressing the entrainment of droplets to the air inlet 3b by reducing the speed of air.

In addition, according to an embodiment of the present disclosure, the plurality of first ribs 68, 69, and 73b include the front ribs (see the first ribs 68 and 69) extending from the front end of the flow path portion 65 to the middle portion of the flow path portion 65 within the flow path width in the vehicle front-rear direction and the rear rib (see the first rib 73b) that is spaced apart in the vehicle width direction from the front rib and extends from the rear end of the flow path portion 64 to the middle portion of the flow path portion 64 within the flow path width in the vehicle front-rear direction, and the front ribs and the rear rib partially overlap with each other in vehicle side view (see FIG. 13).

In this structure, the space above the flow path portions 65 and 64 in vehicle side view can be partitioned in the width direction by the first ribs 68, 69, and 73b to reduce the speed of the air to be introduced to the air inlet 3b (see FIG. 7) more effectively.

According to an embodiment of the present disclosure, the drain member 60 extends in the vehicle width direction and has the inclined portion 63 inclined downward toward the outer side in the vehicle width direction (see FIGS. 7 and 8).

In this structure, since the inclined portion 63 described above of the drain member 60 is inclined downward toward the outer side in the vehicle width direction and the drain route on the upper surface of the inclined portion 63 is located downward toward the air inlet of the dash panel (dash lower panel 3), the entrainment of droplets to the air inlet 3b can be further suppressed.

In addition, according to an embodiment of the present disclosure, the drain member 60 has the slope-shaped portion 67 that extends upward toward the rear side from the rear end of the flow path portion 64, and the slope-shaped portion 67 has the plurality of second ribs 71, 72, and 73 extending in the vehicle front-rear direction so as to be spaced apart in the vehicle width direction (see FIGS. 13 and 14).

In this structure, while the water flowing through the slope-shaped portion 67 flows downward to the flow path portion 64, the speed of the air flowing in the vehicle width direction in the closed cross-section 26 above the water in the slope-shaped portion 67 can be reduced by the second ribs 71, 72, and 73 described above. As a result, the entrainment of droplets to the air inlet 3b described above can be further suppressed.

In addition, according to an embodiment of the present disclosure, the second ribs 71, 72, and 73 of the slope-shaped portion 67 has the slanting portions 72a and 73a inclined to the inner side in the vehicle width direction toward the lower side (see FIG. 13).

In this structure, the direction of the water flowing through the slope-shaped portion 67 is once changed to the inner side in the vehicle width direction by the slanting portions 72a and 73a to reduce the momentum of the water, thereby reducing the flow speed thereof. This can suppress the generation of droplets when the water flows from the slope-shaped portion 67 downward and meets the flow path portion 64.

In addition, the water flowing through the slope-shaped portion 67 can flow downward and meet the flow path portion 64 described above at the position away from the air inlet 3b of the dash panel (dash lower panel 3) toward the inner side in the vehicle width direction.

In the correspondence between the structure of the present disclosure and the example described above, the dash panel according to the present disclosure corresponds to the dash lower panel 3 according to the example, similarly, the air speed reduction portion corresponds to the first ribs 68, 69, and 73b, but the present disclosure is not limited to only the structure of the example described above and may be practiced in many other embodiments.

For example, a communication hole for communication between the upstream side and the downstream side of the flow path portion 65 may be opened and formed at the roots of the first ribs 68, 69, and 73b illustrated in FIG. 14 and the angle formed by the wall portion 63c of the flow path portion 65 and the first ribs 68 and 69 may be set to the right angle or less.

INDUSTRIAL APPLICABILITY

As described above, the present disclosure is useful for the front structure of a vehicle that includes a dash panel that extends in the vehicle width direction and performs partitioning into an engine compartment and a vehicle interior in the vehicle front-rear direction, an air inlet provided on one end side in the vehicle width direction of the dash panel, and a cowl grille that has an outside air introduction hole at a position away from the air inlet to the other end side in the vehicle width direction.

DESCRIPTION OF REFERENCE SIGNS AND NUMERALS

1: engine compartment
2: vehicle interior
3: dash lower panel (dash panel)
3b: air inlet
24: cowl grille
25: outside air introduction hole
26: closed cross-section
60: drain member
63: inclined portion
64, 65: flow path portion
67: slope-shaped portion
68, 69: first rib (air speed reduction portion, front rib)
71, 72, 73: second rib
72a, 73a: slanting portion
73b: first rib (air speed reduction portion, rear rib)

The invention claimed is:
1. A front structure of a vehicle, comprising:
a dash panel that extends in a vehicle width direction and performs partitioning into an engine compartment and a vehicle interior in a vehicle front-rear direction;

an air inlet provided on one end side in the vehicle width direction of the dash panel;

a cowl grille that has an outside air introduction hole at a position away from the air inlet toward another end side in the vehicle width direction; and a drain provided below the cowl grille, the drain forming a closed cross-section in cooperation with the cowl grille, wherein the drain has a flow path portion that extends in the vehicle width direction and serves as a path through which water flows, and the flow path portion has an air speed reduction portion that reduces a flow speed of air flowing through the flow path portion in a region ranging from a position that overlaps with the outside air introduction hole in the vehicle width direction to the air inlet.

2. The front structure of a vehicle according to claim 1, wherein the air speed reduction portion includes a plurality of first ribs that extend in the vehicle front-rear direction in the flow path portion and partially overlap with each other in vehicle side view.

3. The front structure of a vehicle according to claim 2, wherein the first ribs extend from a front end or a rear end of the flow path portion toward a middle portion of the flow path portion within a flow path width in the vehicle front-rear direction of the flow path portion and is inclined to an outer side in the vehicle width direction toward the middle portion of the flow path portion.

4. The front structure of a vehicle according to claim 3, wherein the plurality of first ribs include a front rib extending from the front end of the flow path portion to the middle portion of the flow path portion within a flow path width in the vehicle front-rear direction and a rear rib spaced apart in the vehicle width direction from the front rib, the rear rib extending from the rear end of the flow path portion to the middle portion of the flow path portion within the flow path width in the vehicle front-rear direction, and the front rib and the rear rib partially overlap with each other in vehicle side view.

5. The front structure of a vehicle according to claim 4, wherein the drain extends in the vehicle width direction and has an inclined portion inclined downward toward the outer side in the vehicle width direction.

6. The front structure of a vehicle according to claim 5, wherein the drain has a slope-shaped portion that extends upward toward a rear side from the rear end of the flow path portion, and the slope-shaped portion has a plurality of second ribs extending in the vehicle front-rear direction, the second ribs being spaced apart from each other in the vehicle width direction.

7. The front structure of a vehicle according to claim 6, wherein the second ribs of the slope-shaped portion has a slanting portion inclined to an inner side in the vehicle width direction toward a lower side.

8. The front structure of a vehicle according to claim 1, wherein the drain extends in the vehicle width direction and has an inclined portion inclined downward toward the outer side in the vehicle width direction.

9. The front structure of a vehicle according to claim 1, wherein the drain has a slope-shaped portion that extends upward toward a rear side from a rear end of the flow path portion, and the slope-shaped portion has a plurality of second ribs extending in the vehicle front-rear direction, the second ribs being spaced apart from each other in the vehicle width direction.

10. The front structure of a vehicle according to claim 9, wherein the second ribs of the slope-shaped portion has a slanting portion inclined to an inner side in the vehicle width direction toward a lower side.

* * * * *